United States Patent [19]

Trelby

[11] 4,033,376

[45] July 5, 1977

[54] ROTARY DRUM PLANT WITH WATER INTRODUCTION SYSTEM

[75] Inventor: Ib Verner Trelby, Copenhagen, Denmark

[73] Assignee: F. L. Smidth & Co., Cresskill, N.J.

[22] Filed: Apr. 30, 1976

[21] Appl. No.: 681,835

[30] Foreign Application Priority Data

May 7, 1975 United Kingdom ............. 19187/75

[52] U.S. Cl. ................................ 137/580; 137/581; 165/70; 165/89

[51] Int. Cl.² ........................................ F16L 27/00

[58] Field of Search ............. 137/580, 581; 165/89, 165/90, 70

[56] References Cited

UNITED STATES PATENTS

| | | | |
|---|---|---|---|
| 2,310,309 | 2/1943 | Orr | 137/580 |
| 3,552,484 | 1/1971 | Ural, Jr. et al. | 165/89 |
| 3,587,638 | 6/1971 | Lambrecht et al. | 137/580 |
| 3,640,000 | 2/1972 | Lee et al. | 165/89 |
| 3,882,894 | 5/1975 | Huettner | 137/581 |
| 3,894,558 | 7/1975 | Pederson | 137/580 |
| 3,911,952 | 10/1974 | Sugahara et al. | 137/580 |
| 3,918,486 | 11/1975 | Cyphelly | 137/580 |
| 3,948,283 | 4/1976 | Asfura | 137/580 |

FOREIGN PATENTS OR APPLICATIONS

| | | |
|---|---|---|
| 1,525,479 | 10/1969 | Germany |
| 2,109,194 | 9/1971 | Germany |

*Primary Examiner*—William R. Cline

*Assistant Examiner*—H. Jay Spiegel

*Attorney, Agent, or Firm*—Pennie & Edmonds

[57] ABSTRACT

A rotary drum plant is disclosed in which a unique system for directing a liquid medium to the rotating drum is utilized. A rotary drum such as a tube mill has a driving shaft connected thereto, with at least one U-shaped inner ring member having a channel-like cross-section positioned about the shaft and mounted for rotation therewith with the opening of the U-shape facing radially outwardly. At least one stationary ring member has a generally rectangular cross-sectional configuration and is positioned about the rotating U-shaped member to form a generally annular chamber with the U-shaped inner ring. A conduit adapted for carrying a liquid medium such as water communicates the chamber to the rotating drum and rotates therewith, while another liquid conduit directs the liquid medium to the chamber via the stationary ring member. The system utilizes unique sealing means attached to the stationary ring member and extending into the U-shaped member while positioned for slideable contact with inner wall surface portions of the radial walls of the inner U-shaped ring. Thus, a liquid medium to be conveyed to the rotating drum is first directed to the annular chamber and thereafter directed via the appropriate rotating liquid conduit to the rotating drum. A housing preferably encompasses the ring member and is connected, as part of the liquid circulation system, to a return overflow line from the housing for liquid from the housing back to the tank.

20 Claims, 3 Drawing Figures

ROTARY DRUM PLANT WITH WATER INTRODUCTION SYSTEM

BACKGROUND OF THE INVENTION

1. Field of the Invention

This invention relates to rotary drum plants having rotary drums such as tube mills, with means for introducing liquid media such as water into the rotating drum.

2. Description of the prior Art

In the presently known systems for introducing liquid media such as water into rotating drums such as tube mills, kilns and the like, injection chambers defined in part by rotating elements have been utilized. One such injection chamber of the prior art consisted of a U-shaped steel ring attached to, and rotatable with, a driving shaft of the drum adjacent to an end of the drum, with the opening of the U configuration facing radially outwardly. A stationary steel ring of substantially rectangular cross-section was so mounted around the rotatable ring as to form a closure for the opening of the U of the rotatable ring. The two rings in combination thus formed an annular chamber around the driving shaft. Liquid was fed to the chamber through a tube connected to the stationary ring, and from the chamber into the drum through one or more tubes leading from that wall of the rotatable ring which faced the drum end. By means of the chamber, the supply of liquid to the drum was consequently fed from a stationary supply tube to a rotating outlet tube or tubes.

In these known types of injection chambers, it has been extremely difficult to achieve a satisfactory sealing between the rotating and stationary rings of the chamber as the seal has to resist simultaneously both the substantial mechanical wear to which it is subjected, as well as the heavy water pressure. The constructions so far have therefore been complicated and costly to manufacture and mount. I have invented a rotary drum plant and a system for continuously directing a liquid medium through such rotary drum plants in a manner which is less costly, more efficient and avoids substantially all of the problems of those of the prior art heretofore described.

SUMMARY OF THE INVENTION

The invention relates to a rotary drum plant which comprises a rotatable drum and a shaft connected thereto for rotation therewith, a generally U-configured inner ring member secured to the rotating shaft so as to rotate therewith, with the opening of the U-configured ring member facing radially outwardly, at least one outer stationary ring member having a generally rectangular cross-sectional configuration positioned about the rotatable U-shaped ring member to form a generally annular chamber with the inner U-configured ring member around the rotatable shaft, at least one conduit connected to the outer stationary ring member and adapted to direct a liquid medium to the chamber, and at least one conduit communicating from a rotatable wall of the U-configured ring member and adapted to direct a liquid medium from the chamber to the rotatable drum. The invention further comprises sealing means positioned between the stationary and rotatable ring members, each sealing means being comprised of at least one annular sealing element mounted on the stationary ring member and positioned to bear against inner surface portions of adjacent corresponding radial wall portions of the U-configured rotatable ring to form a liquid seal between the ring members.

Thus, the seal between the stationary and rotatable rings is constituted by two annular stationary sealing elements— which are preferably flexible and elastic — and are mounted on the outer, stationary ring. These elements project into the rotatable ring and bear against the inner surface of a corresponding one of the radial walls of the V of the rotatable ring.

The new seal may be simple in construction and easily fitted while being wear-resistant, efficient and inexpensive to manufacture. Further, it will be seen that the action of the seal is uniquely assisted by the water pressure in the chamber which urges the flexible sealing elements to flex axially into sealing contact with the rotating inner walls of the chamber along its whole circumference.

The sealing elements may comprise annular disks lying in radial planes, and these disks may be supported on their faces remote from the corresponding walls of the rotatable ring by stiffening elements, also attached to the stationary ring.

The annular disks may themselves engage the walls of the rotatable ring to provide the sealing contact. Alternatively, the sealing elements may be provided with an annular packing in their area of contact with the rotatable ring.

In a first preferred embodiment, it will be seen that a plurality of annular disks may be utilized in side-by-side relation in contacting radial relation to form the sealing element which contacts the inner surface portions of the rotatable ring. In still another preferred embodiment, the sealing means is comprised, at least in part, of an annular packing material which is adapted to contact in water-tight sealed relation, the adjacent inner surface portions of the inner radial walls of the rotating inner U-shaped ring. The outer stationary ring is preferably constructed in several sections to accommodate mounting of the sealing means thereon; however, it is within the scope of the present invention to construct the outer ring as a unitary member while providing other suitable means to mount the sealing means thereto so as to simultaneously be maintained in contacting relation with the rotating inner surface portions of the inner U-shaped rotatable ring.

An inventive rotary drum plant such as a tube mill plant may incorporate the system disclosed herein to provide unique, inexpensive and efficient water circulation and transfer to the tube mill during rotation so as to substantially avoid all of the disadvantages of prior art techniques.

BRIEF DESCRIPTION OF THE DRAWINGS

Preferred embodiments of the invention are described hereinbelow with reference to the accompanying drawings wherein.

DETAILED DESCRIPTION OF THE PREFERRED EMBODIMENTS

Figure 1:
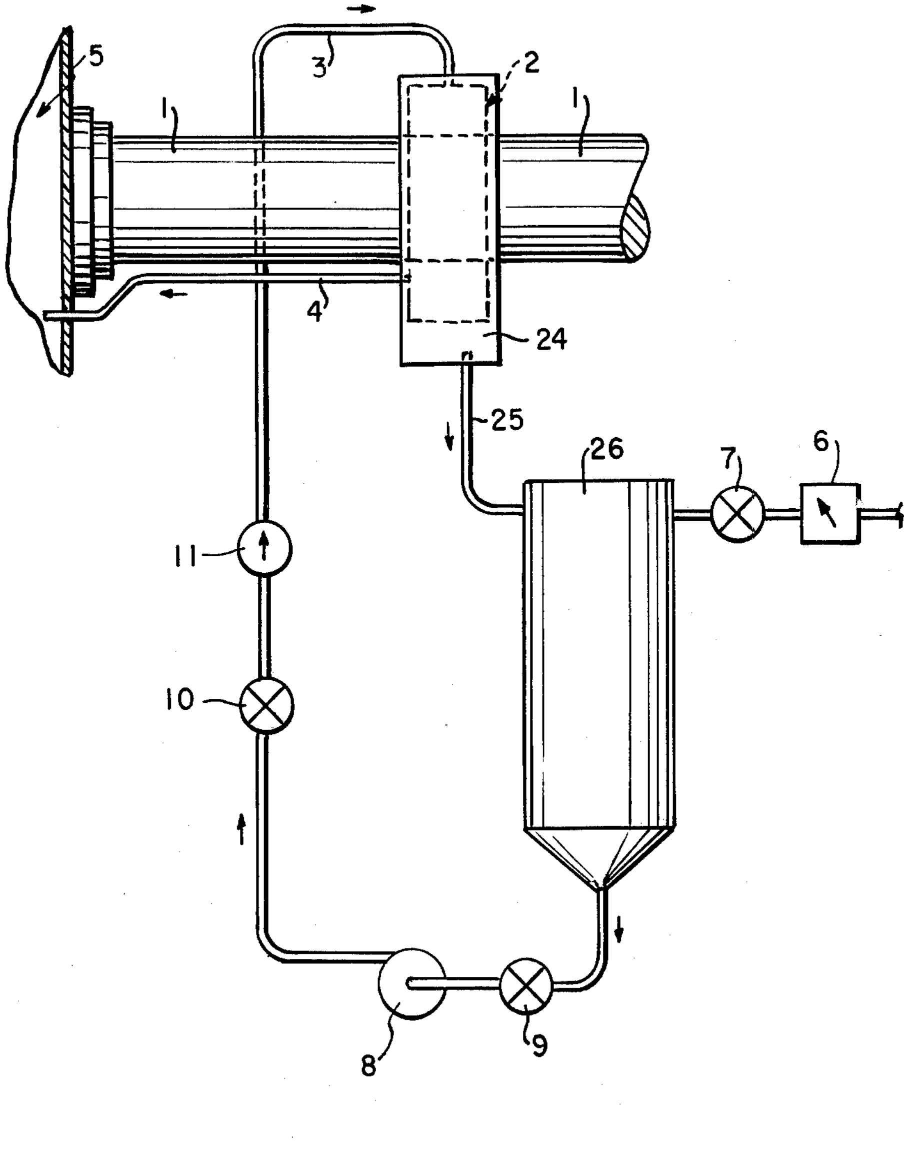
FIG. 1 is a diagrammatic representation of a rotary drum plant constructed according to the invention, with a water injection chamber provided on the driving shaft of the rotatable drum.

The plant shown in FIG. 1 has a driving shaft 1 for a rotating drum 5, a water injection chamber 2 surrounded by a water jacket 24, a tube 3 for supplying water to the chamber and a tube 4 for leading water from the chamber into the drum. The supply of water takes place from a water tank 26 by means of a water pump 8. Upstream of the water tank 26 there is provided a water meter 6 and a regulating valve 7. Between water tank 26 and pump 8, one regulating valve 9 is provided, and downstream of the water pump a regulating valve 10 and a check valve 11 are provided. A return overflow line 25 is provided for water from the water jacket 24 back to the tank 26.

Figure 2:
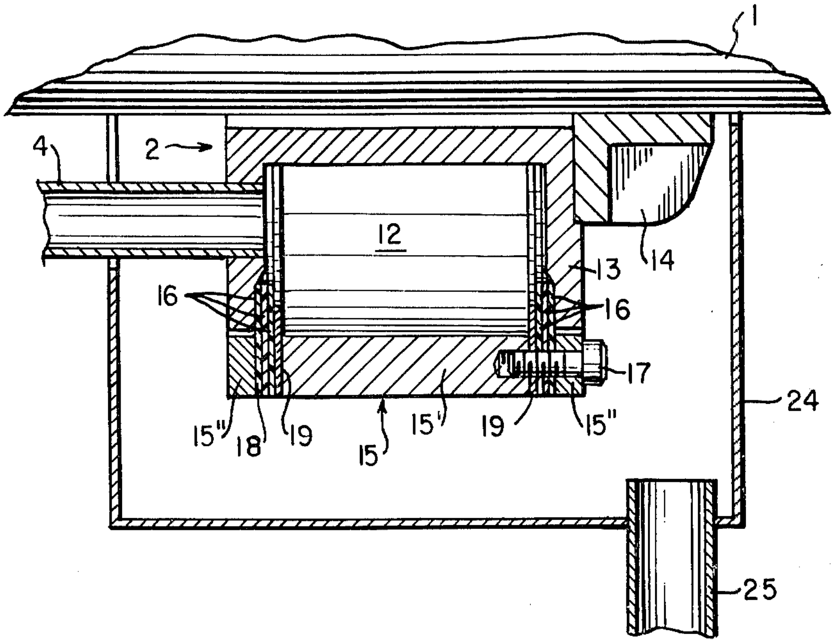
FIG. 2 is a vertical cross-sectional view of a portion of the water injection chamber of the plant of FIG. 1.

Referring to FIG. 2, there is illustrated the construction of the water injection chamber 2 of FIG. 1. This chamber is formed by a steel ring 13 of U-shaped cross-section, the ring being attached to the driving shaft 1 by means of angular flanges 14 so as to rotate with the shaft. The chamber is further defined by another steel ring 15 of rectangular cross-section which is somehow prevented from rotating, for instance, by being mounted by means of a stationary bracket (not shown). Both the rings 13 and 15 are formed as half rings which are fitted around the shaft 1 and bolted together. The two rings in combination form a chamber 12 around the driving shaft. The steel ring 15 is composed of three annular parts, a central part 15′ and two identical outer parts 15″. Water is passed to the chamber through the tube 3 (FIG. 1) and from the chamber into the drum through the tube 4. The tube 3 (FIG. 1) opens into the stationary ring 15, whereas the tube 4 is mounted in that wall of the ring 13 which faces the drum and rotates with the driving shaft and consequently with the drum.

The seal between the two rings along the whole circumference of the chamber is constituted by annular disk-shaped flexible elastic sealing elements 16, which are attached to the outer ring at radial planes corresponding to the inner surfaces of the radial walls of the chamber 12 in such manner that a part of each sealing element 16 projects into, and bears against a part of the corresponding inner surface of the rotating ring 13. Thus, when water is injected through the chamber, the water pressure presses the flexible, stationary sealing elements 16 outwardly to form sealing contact with the inner wall of the rotating ring 13. The annular flexible sealing elements may be either of a homogeneous plastics material mass formed in one piece or built up of a plurality of plastics layers of a type suitable for resisting wear on such sliding surfaces as face the rotating ring 13 and for resisting the inpact forces of the water. To prevent any tendency of the elements of the elastic sealing device to bend inwardly towards the interior of the chamber, stiffening rings 19 of fibrous material or steel may be provided along the inner side of each element at the radial plane. The rings 19 are — similarly to the sealing elements 16 — attached to the outer ring 15 of the chamber. The sealing elements and stiffening rings may be retained between the parts 15′ and 15″ of the outer ring by screws 17, of which only the screw for the element 16 and the stiffening ring 19 on the right-hand side of the chamber is shown in FIG. 2.

Figure 3:
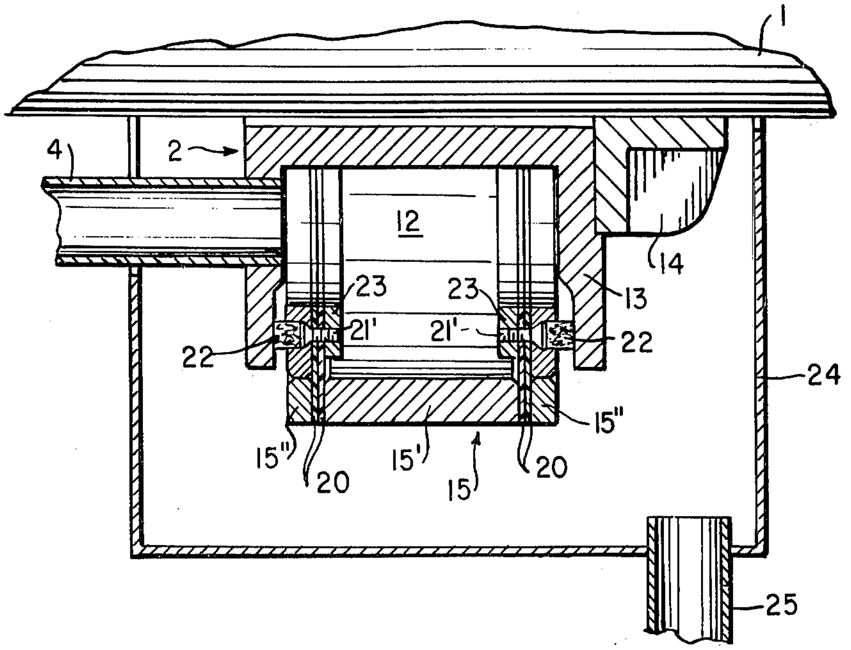
FIG. 3 is a vertical cross-sectional view of an alternate embodiment of a water injection chamber utilizing an alternate chamber seal.

FIG. 3 shows another example of the seal between the rotating U-shaped ring 13 and the stationary outer ring consisting of the parts 15′ and 15″. In this case, the seal consists of a flexible annular disk element 20 attached between the ring parts 15′ and 15″. A steel ring 21 is secured to the flexible element 20 by means of screws 21′ and provided with a recess for an annular packing 22 which constitutes the contact proper with the outer parts of the inner walls of the rotating ring 13. A retainer ring 23 is provided for insertion of the screws 21′. The heads of the screws rest against the bottom of the recess, the packing 22 rests within the recess adjacent the screws as shown. The retainer ring may be of steel construction or it may be of other suitable fibrous material, and the flexible element 20 may be of a suitable plastics material. The edges of the ring parts 15′ and 15″ where the flexible element is held and such edges of the steel ring 21 as face the ring parts 15″ may be chamfered in order to ensure the unimpeded outward movement of the seal in the direction of the inner sides of the rotating ring 13 by means of the water pressure in the chamber. I claim:

1. A rotary drum plant which comprises a rotatable drum and a shaft connected thereto for rotation therewith, a generally U-configured inner ring member secured to said rotating shaft so as to rotate therewith, with the opening of the U-configured ring member facing radially outwardly, at least one outer stationary ring member having a generally rectangular cross-sectional configuration position about said rotatable U-shaped ring member to form a generally annular chamber with said inner U-configured ring member around said rotatable shaft, at least one conduit connected to the outer stationary ring member and adapted to direct a liquid medium to the chamber, at least one conduit communicating with a rotatable will of said U-configured ring member and adapted to direct a liquid medium from said chamber to said rotatable drum, and sealing means positioned between the stationary and rotatable ring members, each sealing means being comprised of at least one annular sealing element mounted on said stationary ring member and positioned to contact inner surface portions of adjacent corresponding radial wall portions of said U-configured rotatable ring to form a liquid seal between said ring members.

2. The rotary drum plant according to claim 1 wherein each sealing means comprises at least one flexible annular disk positioned in a generally radial plane.

3. The rotary drum plant according to claim 2 wherein each seal means to comprised of at least one sealing element provided with annular packing means in the area of contact with the rotatable ring.

4. The rotary drum plant according to claim 1 wherein each seal means comprises at least two flexible annular disks positioned in generally radial planes.

5. The rotary drum plant according to claim 4 wherein each seal means comprises at least three flexible annular disks positioned in generally radial planes.

6. The rotary drum plant according to claim 5 wherein said seal means comprises at least two flexible annular disk elements positioned radially and secured to said stationary ring so as to contact said radial walls of said U-shaped ring such that the pressure of water introduced into said annular chamber causes said flexible disk to bear sufficiently against said radial walls to seal said annular chamber in water-tight relation from said rotatable ring to said stationary ring member.

7. The rotary drum plant according to claim 6 further comprising at least three flexible annular disks positioned in face-to-face contacting relation and connected to the stationary ring member with at least one surface of at least one disk in slideable contacting relation with the inner surface portions of the corresponding radial wall portions of the rotatable ring member.

8. The rotary drum plant according to claim 5 wherein said generally radial disks are supported on their faces remote from the corresponding walls of the rotatable ring member by relatively rigid supporting members attached to the stationary ring.

9. The rotary drum plant according to claim 1 wherein each seal means is comprised of at least one sealing element provided with annular packing means in the area of contact with the rotatable ring.

10. The rotary drum plant according to claim 1 wherein said outer ring member is comprised of three sections secured together in a manner to support flexible seal means in contacting relation with the rotatable ring member.

11. The rotary drum plant according to claim 10 wherein said seal means is comprised of an annular packing material positioned between radial wall portions of said rotatable ring member and adjacent portions of said stationary ring member to form a slideable sealed connection between said members so as to render said annular chamber substantially liquid impermeable.

12. A rotary drum plant which comprises:

a. a rotatable drum;

b. a drive shaft connected to said drum for driving rotation therewith;

c. an annular chamber surrounding said shaft, said chamber being defined by a first U-shaped steel ring attached to, and rotatable with the shaft at a position adjacent to at least one end portion of the drum, the open portion of the U-shaped steel ring facing in a generally outward radial direction;

d. a stationary steel ring having a generally rectangular cross-section mounted peripherally about said rotatable ring so as to form generally a closure for said opening of said rotatable ring, the rings thereby defining an annular chamber about said driving shaft;

e. a tubular member connected to said outer stationary steel ring for feeding a liquid medium such as water to said chamber;

f. at least one tubular member connected at one end to at least one end portion of said rotatable drum and at the other end portion to a rotatable radial wall portion of said rotatable U-shaped steel ring facing said drum, said tubular member being adapted for directing the liquid medium from said annular chamber to said drum; and g. annular sealing means positioned between the stationary and rotatable steel rings along each peripheral end portion of said outer steel ring and extending radially from the annular edge portions of said stationary ring to said radial wall portions of said U-shaped ring to provide sealing therebetween, each sealing means being positioned to bear sufficiently against the inner surface portions of a corresponding radial wall of said rotatable steel ring when a liquid medium is introduced into said annular chamber to thereby form a substantially liquid-tight sealing between said ring members of said chamber due to the pressure of the liquid medium acting against said sealing means.

13. A rotary drum plant which comprises:

a. a rotatable drum such as a tube mill and a shaft connected thereto for rotatably dirving said drum;

b. at least one first inner steel ring secured about said driving shaft for rotation therewith, said steel ring having first steel base member generally peripherally connected to said driving shaft and at least two radial walls extending outwardly from each peripheral end portion of said base member to define a U-shaped cross-sectional ring configuration having the open portion thereof facing radially outwardly;

c. at least one second stationary steel ring having a generally rectangular cross-sectional configuration and positioned about said rotatable U-shaped ring so as to form a general closure for the opening defined by said first rotatable ring whereby said at least two steel rings combine to define a generally annular chamber about said driving shaft;

d. at least one stationary tubular member connected to the outer stationary ring for directing liquid to said chamber;

e. at least one tubular member connected at one end to an end wall portion of said drum and rotatable therewith and communicating with the inner portions thereof, the other end of said tubular member being connected to the rotatable ring for rotation therewith; and f. flexible annular sealing means connected to each peripheral end portion of said stationary ring, said flexible sealing means being mounted for slideable contact with the inner surface portions of said corresponding radial walls of the rotatable ring such that the pressure of a liquid medium introduced into said chamber causes said sealing means to bear sufficiently against inner wall portions of said radial walls of said rotatable ring to form a substantially liquid-tight seal between said inner and outer steel rings.

14. A system for continuously directing a liquid medium such as water to a rotating drum such as a rotating tube mill wherein an elongated drive shaft is attached to the rotating drum for rotationally driving the drum which comprises:

a. an inner ring member having a generally U-shaped cross-sectional configuration position about the shaft and defined by a first arcuate plate member extending peripherally about the shaft in adjacent relation thereto and at least two wall portions extending generally radially outwardly from each peripheral edge portion of the first peripheral arcuate plate member and from said shaft;

b. means to secure said U-shaped ring member to said shaft for rotation therewith;

c. an outer ring member positioned peripherally about the inner U-shaped ring member and configured to form a general closure with the U-shaped ring member so as to define generally with said U-shaped ring member, an injection chamber about said shaft, said outer ring member being stationarily secured relative to the rotating shaft;

d. seal means fixedly secured to said stationary ring and positioned such that surface portions thereof contact inner opposed facing surface portions of the rotating ring member in sealed relation therewith;

e. housing means enclosing said ring members and a portion of said rotating shaft;

f. a tubular member connected at one end with a rotating radial wall portion of said inner ring member and communicating with said chamber and, at the other end, with an end wall portion of the rotating drum in communication with inner portions of the drum to supply liquid medium such as water from said chamber to said drum;

g. means to provide a supply of liquid medium;

h. a tubular member connected at one end to a lower portion of said housing surrounding said drive shaft and the other end to an upper portion of said liquid supply means for directing return overflow portions of liquid medium from the housing to the liquid supply means;

i. a tubular member connecting the lower portion of the liquid supply means to a first regulating valve;

j. a tubular member connecting the first regulating valve to a pump for pumping liquid medium from said liquid supply means to said housing;

k. a tubular member connecting said water pump to a second regulating valve to pump water through the system;

1. a tubular member connecting the second regulating valve to a pressure check valve to maintain predetermined water pressure in said tubular member; and m. a tubular member connecting the check valve to said stationary outer ring surrounding said shaft and communicating with said chamber defined by said inner and outer rings so as to direct a liquid medium from said supply medium into said chamber to said rotating drum.

15. The system for continuously directing a liquid medium according to claim 14 wherein each seal means is comprised of at least one flexible elastic annular sealing member.

16. The system for continuously directing a liquid medium according to claim 15 wherein said liquid supply means is comprised of a water tank, and a third regulating valve is connected to air inlet to said water tank.

17. The system for continuously directing a liquid medium according to claim 16, wherein a water meter is connected to said third regulating valve.

18. The system for continuously directing a liquid medium according to claim 14 wherein each seal means is comprised of fibrous annular packing material positioned in contacting relation with rotating wall portions of said inner U-shaped ring member.

19. The system for continuously directly a liquid medium according to claim 18 wherein said liquid supply means is comprised of a water tank, and a third regulating valve is connected to air inlet to said water tank.

20. The system for continuously directing a liquid medium according to claim 19 wherein a water meter is connected to said third regulating valve.

* * * * *

UNITED STATES PATENT AND TRADEMARK OFFICE

CERTIFICATE OF CORRECTION

PATENT NO. : 4,033,376

DATED : July 5, 1977

INVENTOR(S) : Ib Verner Trelby

It is certified that error appears in the above-identified patent and that said Letters Patent are hereby corrected as shown below:

Column 3, line 54, "inpact" should read -- impact --

Column 4, line 9, "recess, the packing" should read -- recess, and the packing --

Column 4, line 33, "with a rotatable will" should read -- with a rotatable wall --

Claim 3, Column 4, line 48, "means to comprised of" should read -- means is comprised of --

Claim 13, Column 6, line 2, "dirving" should read -- driving --

Claim 13, Column 6, line 8, "said base member" should read -- said steel base member --

Claim 14, Column 7, line 9, "and the other end" should read -- and at the other end --

Claim 16, Column 8, line 10, "to air inlet to" should read -- to an inlet to --

UNITED STATES PATENT AND TRADEMARK OFFICE

CERTIFICATE OF CORRECTION

PATENT NO. : 4,033,376

DATED : July 5, 1977

INVENTOR(S) : Ib Verner Trelby

It is certified that error appears in the above-identified patent and that said Letters Patent are hereby corrected as shown below:

Claim 19, Column 8, line 20, "continuously directly" should read -- continuously directing --

Claim 19, Column 8, line 23, "to air inlet to" should read -- to an inlet to --

Signed and Sealed this

*Seventh* Day of *March 1978*

[SEAL]

*Attest:*

RUTH C. MASON
*Attesting Officer*

LUTRELLE F. PARKER
*Acting Commissioner of Patents and Trademarks*